United States Patent
Youm

(10) Patent No.: US 10,234,909 B2
(45) Date of Patent: Mar. 19, 2019

(54) PORTABLE DEVICE WITH OPTICAL MEMBER FOR BACK SIDE CAMERA

(71) Applicant: Samsung Electronics Co., Ltd., Gyeonggi-do (KR)

(72) Inventor: Sang-Bum Youm, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/045,213

(22) Filed: Jul. 25, 2018

(65) Prior Publication Data

US 2019/0033927 A1 Jan. 31, 2019

(30) Foreign Application Priority Data

Jul. 25, 2017 (KR) .................. 10-2017-0093915

(51) Int. Cl.
*G06F 1/16* (2006.01)
*H04N 5/225* (2006.01)

(52) U.S. Cl.
CPC .......... *G06F 1/1686* (2013.01); *G06F 1/1616* (2013.01); *G06F 1/1656* (2013.01); *H04N 5/2254* (2013.01)

(58) Field of Classification Search
CPC ..... G06F 1/1601; G06F 1/1602; G06F 1/1605
See application file for complete search history.

(56) References Cited

U.S. PATENT DOCUMENTS

| | | | | |
|---|---|---|---|---|
| 7,570,485 B2* | 8/2009 | Krah | ..................... | G06F 1/1616 345/157 |
| 7,948,752 B2* | 5/2011 | Tatsukami | ............ | G06F 1/1616 348/207.1 |
| 8,405,765 B2* | 3/2013 | Lin | ..................... | H04N 5/2257 348/373 |
| 9,392,148 B2* | 7/2016 | Kim | ..................... | G06F 1/1605 |
| 2005/0140778 A1* | 6/2005 | Kim | ..................... | G06F 1/1605 348/14.02 |
| 2005/0168924 A1* | 8/2005 | Wu | ..................... | G06F 1/1616 361/679.58 |
| 2013/0076591 A1* | 3/2013 | Sirpal | .................. | G06F 3/1438 345/1.3 |
| 2016/0248950 A1 | 8/2016 | Burton | | |

FOREIGN PATENT DOCUMENTS

JP 2005057548 3/2005

\* cited by examiner

*Primary Examiner* — Anthony Q Edwards
(74) *Attorney, Agent, or Firm* — The Farrell Law Firm, P.C.

(57) ABSTRACT

A portable device with improved camera functionality is provided. The portable device includes a second housing rotatably coupled to a hinge device in a first housing, and a front-rear camera mounted to a first region of the second housing. An opening may be located in a second region of the first housing overlapping with the first region when the second housing is in a state of being folded to the first housing.

20 Claims, 16 Drawing Sheets

PORTABLE DEVICE WITH OPTICAL MEMBER FOR BACK SIDE CAMERA

CROSS-REFERENCE TO RELATED APPLICATIONS

This application is based on and claims priority under 35 U.S.C. § 119 to Korean Patent Application Serial No. 10-2017-0093915, filed on Jul. 25, 2017, in the Korean Intellectual Property Office, the entire disclosure of which is incorporated herein by reference.

BACKGROUND

1. Field

The present disclosure relates to a portable device with improved camera usability.

2. Description of Related Art

In general, a portable device, such as a convertible personal computer (PC), is configured such that a data input unit is disposed on a main body, and a display is rotatably coupled to the main body via a hinge device.

The portable device has a structure in which a camera is disposed on a display unit to capture a subject located in a forward or backward direction. However, the portable device having the camera mounted thereon, for example, the convertible PC, may be restricted by not being able to use the camera in a closed state in which the display is closed against the main body, or in a tablet PC mode in which the display rotates 360 degrees relative to the main body.

SUMMARY

The present disclosure is provided to address at least the above-mentioned problems and/or disadvantages and to provide at least the advantages described below.

Accordingly, an aspect of the present disclosure provides a portable device with improved camera functionality because the camera can be used in a forward or a backward direction in the tablet PC mode of the portable device having the camera mounted thereon.

In accordance with an aspect of the present disclosure, a portable device includes a first housing, a second housing rotatably coupled to a hinge device in the first housing, and a front-rear camera mounted to a first region of the second housing. An opening may be located in a second region of the first housing, which overlaps the first region when the second housing is in a state of being folded to the first housing.

In accordance with another aspect of the present disclosure, a portable device includes a main body, a touchscreen display disposed on the main body in a folding-in or a folding-out state by being rotatably coupled to a hinge device in the main body, a front-rear camera mounted adjacent to the touchscreen display, and an opening disposed on a portion of the main body overlapping with the front-rear camera when the touchscreen display is folded on the main body.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
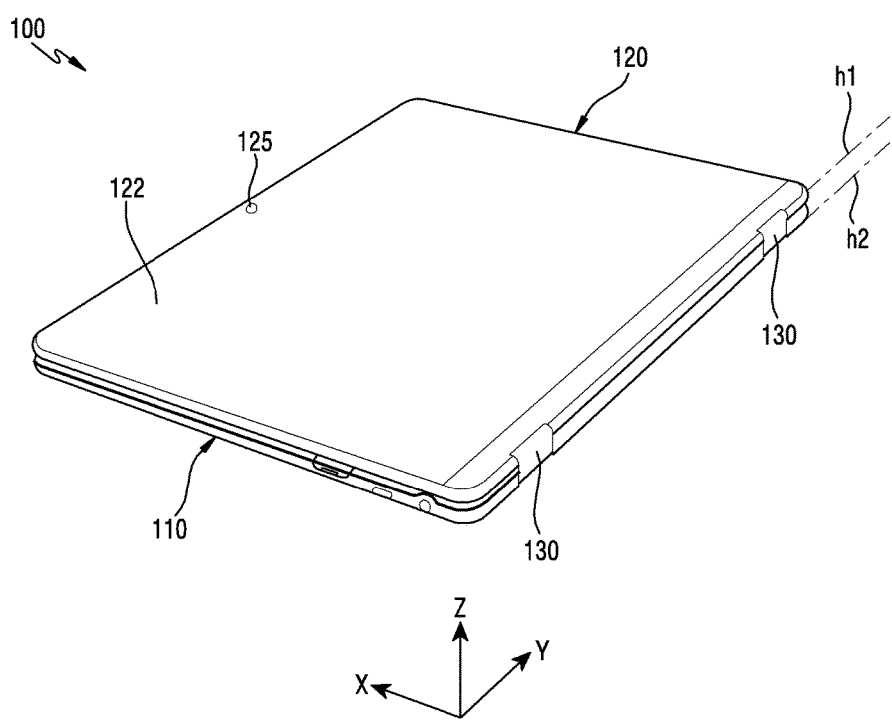
FIG. 1A is a perspective view illustrating a portable device in a closed state, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, the expressions "have", "may have", "include", "comprise", "may include", and "may comprise" indicate the existence of corresponding features (e.g., elements such as numeric values, functions, operations, or components) and do not preclude the presence of additional features.

As used herein, the expressions "A or B", "at least one of A and B", "at least one of A or B", "one or more of A and B", and "one or more of A or B" may include any and all combinations of one or more of the associated listed items. Terms such as "A or B", "at least one of A and B", or "at least one of A or B" may refer any and all of the cases where at least one A is included, where at least one B is included, or where both of at least one A and at least one B are included.

As used herein, terms such as "first" and "second" may refer to elements of various embodiments of the present disclosure, but should not be construed to limit those elements. For example, terms such as "first" and "second" do not limit the order and/or priority of the elements. Furthermore, these terms may be used to distinguish one element from another element. For example, "a first user device" and "a second user device" indicate different user devices regardless of their order or priority. Additionally, without departing from the scope of the present disclosure, a first element may be referred to as a second element, and a second element may be referred to as a first element.

It is to be understood that when an element (e.g., a first element) is referred to as being "operatively" or "communicatively" "coupled with", "coupled to", "connected with" or "connected to" another element (e.g., a second element), the element can be directly coupled with/to another element or coupled with/to another element via an intervening element (e.g., a third element). In contrast, when an element (e.g., a first element) is referred to as being "directly coupled with", "directly coupled to", "directly connected with" or "directly connected to" another element (e.g., a second element), it should be understood that there is no intervening element (e.g., a third element).

As used herein, the expressions "configured to" or "set to" may be interchangeably used with the expressions "suitable for", "having the capacity to", "designed to", "adapted to", "made to", or "capable of". The expressions "configured to" or "set to" should not be construed to only mean "specifically designed to" in hardware. Instead, the expression "a device configured to" may mean that the device is "capable of" operating together with another device or other components. For example, a "processor configured to perform A, B, and C" or a processor set to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

The terms of a singular form may include plural forms unless otherwise specified. Additionally, unless otherwise defined herein, all terms, including technical or scientific terms, may have a meaning that is generally understood by a person skilled in the art. Further, it is to be understood that terms, which are defined in a dictionary and commonly used, should be interpreted as is customary in the relevant related art and not in an idealized or overly formal way, unless expressly so defined herein in accordance with embodiments of the present disclosure. In some cases, even if terms are defined in the specification, they should not be interpreted to exclude embodiments of the present disclosure.

An electronic device may include at least one of smartphones, tablet PCs, mobile phones, video telephones, electronic book readers, desktop PCs, laptop PCs, netbook computers, workstations, servers, personal digital assistants (PDAs), portable multimedia players (PMPs), Motion Picture Experts Group (MPEG) audio layer 3 (MP3) players, mobile medical devices, cameras, or wearable devices (e.g., smart glasses, head-mounted-devices (HMDs), electronic apparel, electronic bracelets, electronic necklaces, electronic appcessories, electronic tattoos, smart mirrors, or smart watches).

Electronic devices may be a smart home appliance including at least one of, televisions (TVs), digital video disk (DVD) players, audios players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, and electronic picture frames.

Additionally, the electronic devices may include at least one of medical devices (e.g., various portable medical measurement devices such as blood glucose monitoring devices, heartbeat measuring devices, blood pressure measuring devices, and body temperature measuring devices, a magnetic resonance angiography (MRA), a magnetic resonance imaging (MRI), a computed tomography (CT), scanners, and ultrasonic devices), navigation electronic devices, global positioning system receivers (GPSs), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or Internet of things (IoT) devices such as light bulbs, various sensors, electric or gas meters, sprinkler devices, fire alarms, thermostats, street lamps, toasters, exercise equipment, hot water tanks, heaters, and boilers.

The electronic devices may include at least one of a part of furniture or buildings/structures, electronic boards, electronic signature receiving devices, projectors, or various measuring instruments (e.g., water meters, electricity meters, gas meters, or wave meters). The electronic devices may be flexible electronic devices.

The electronic devices may be one or more combinations of the above-mentioned devices. Also, electronic devices are not limited to the above-mentioned devices, and may include new electronic devices according to technology development.

Hereinafter, a structure of a portable device (e.g., an electronic device) will be described with reference to the accompanying drawings.

FIG. 1A is a perspective view illustrating a portable device in a closed state, according to an embodiment.

Figure 1B:
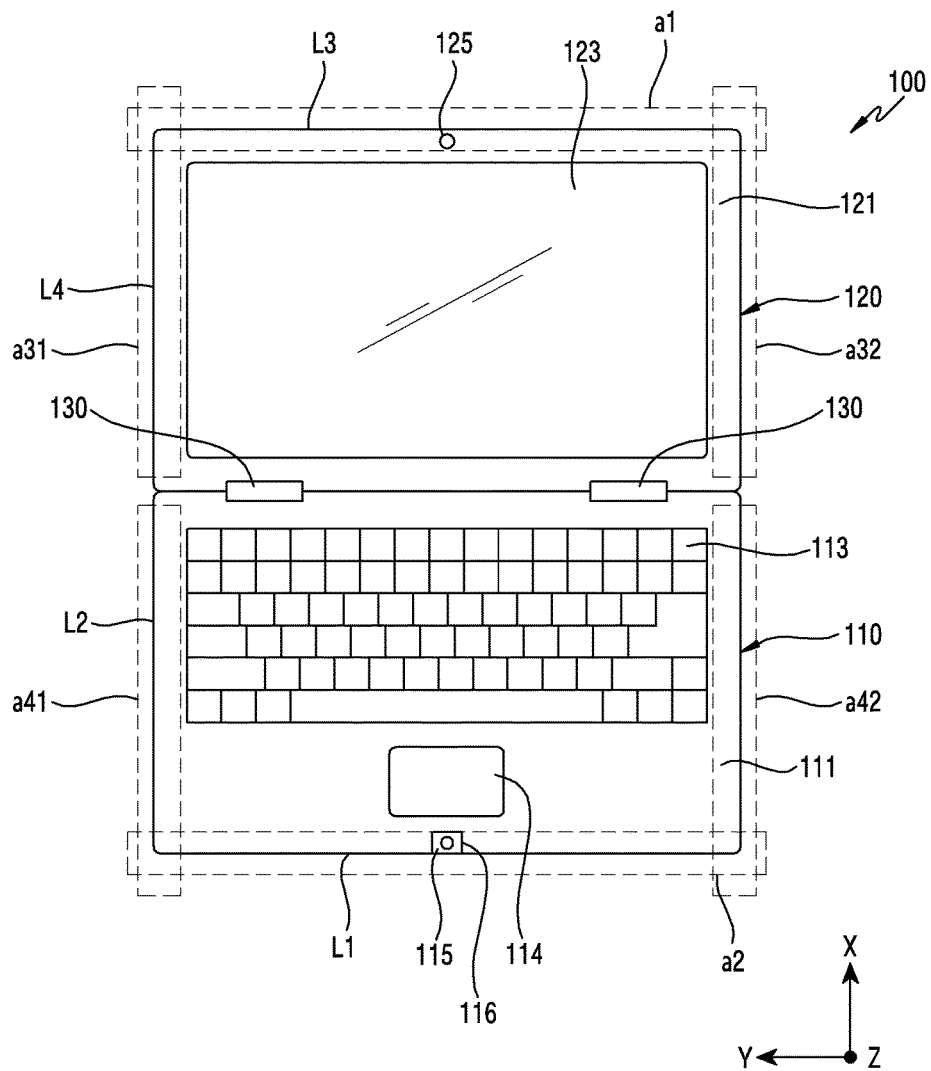
FIG. 1B is a plan view illustrating a portable device in a 180 degree open state, according to an embodiment.

FIG. 1B is a plan view illustrating a portable device in a 180 degree open state, according to an embodiment.

Figure 1C:
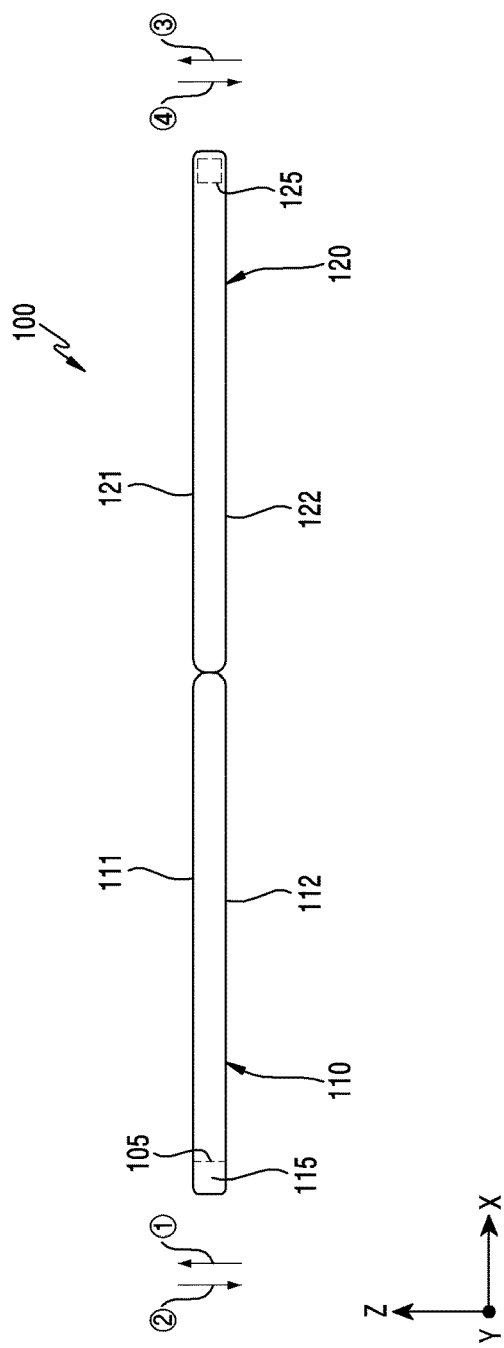
FIG. 1C is a lateral view illustrating a portable device in a 180 degree open state, according to an embodiment.

FIG. 1C is a lateral view illustrating a portable device in a 180 degree open state, according to an embodiment.

In these figures, an orthogonal coordinate system is used in which an X-axis may imply a lengthwise direction of the portable device, a Y-axis may imply a widthwise direction of the portable device, and a Z-axis may imply a thickness direction of the portable device.

Referring to FIG. 1A, FIG. 1B, and FIG. 1C, a portable device 100 includes a first housing 110, a second housing 120, a front-rear camera 125 mounted on the first housing 120, and an opening 116 located in the first housing 110. The first and second housings 110 and 120 may be rotatably coupled to each other via a hinge device 130, and may be electrically coupled (e.g., using a flexible circuit board) to deliver a signal. The first housing 110 may be referred to as any one of a main body, a main body housing, an input housing, an input device, and a first electronic device. The second housing 120 may be referred to as any one of a folder, a folding housing, an output housing, an output device, a display, a touchscreen display, and a second electronic device. The opening 116 located in the first housing 110 may have an open shape in which a portion of the opening is open or a closed shape in which there no opening portion.

The first housing 110 may include a first plate 111 facing a first direction and a second plate 112 facing a second direction opposite the first direction. The first plate 111 may be an upper cover or an inner cover of the first housing 110, and the second plate 112 may be a rear cover or an outer cover thereof.

The second housing 120 may include a third plate 121 facing a third direction and a fourth plate 122 facing a fourth direction opposite the third direction. The third plate 121 may be an upper cover or an inner cover of the second housing 120, and the fourth plate 122 may be a rear cover or an outer cover thereof.

The portable device 100 may include the front-rear camera 125 mounted on a first region a1 of the second housing 120, and the opening 116 located in a second region a2 of the first housing 110, overlapping with the first region a1, when the second housing 120 is in a state of being folded to (i.e., against) the first housing 110. The front-rear camera 125 of the portable device may be capable of capturing a subject located in a forward or backward direction of the front-rear camera 125 via the opening 116. The forward direction may refer to the third direction of the second housing 120, and the backward direction may refer to the fourth direction of the second housing 120.

An optical member 115 such as a detachable lens module may be disposed on the opening 116.

The portable device 100 may have a data input unit 113 disposed on the first plate 111 of the first housing 110, and a data output unit 123 disposed on the third plate 121 of the second housing 120. The data input unit 113 may include a keyboard consisting of a plurality of keys or a touch pad 114, and the data output unit 123 may include a display or a touchscreen display having a touch sensitive panel in the display. Hereinafter, the data output unit 123 may be referred to as the touchscreen display.

The touchscreen display 123 may have a large size to occupy most of the third plate 121 of the portable device 100. A main home screen of the touchscreen display 123 may be a first screen disposed on the touchscreen display 123 when the portable device 100 is powered on. In addition, when the portable device 100 has different home screens consisting of several pages, the main home screen may be a first home screen among the home screens of the several pages. Shortcuts (e.g., main menu toggle keys, time, or weather) may be displayed to execute frequently used applications in the home screen. The main menu may display a menu screen on the touchscreen display 123. In addition, a status bar may be disposed on an upper end of the touchscreen display 123 to display a status of the portable device 100, such as a battery charging status, a strength of a received signal, and a current time. A home button, a menu button, and a back button may be disposed on a lower portion of the touchscreen display 123.

The portable device 100 may have the first region a1 disposed on at least part of a periphery of the touchscreen display 123 and the second region a2 disposed on at least part of a periphery of the data input unit 113.

The first plate 111 of the first housing 110 may have a substantially rectangular shape, and may include two long sides L1 and two short sides L2. Each of the two short sides L2 may be located between the two long sides L1. The long sides L1 may be opposite each other, and the short sides L2 may be opposite each other.

The third plate 121 of the second housing 120 may have a substantially rectangular shape, and may include two long sides L3 and two short sides L4. Each of the two short sides L4 may be located between the two long sides L3. The long sides L3 may be opposite each other, and the short sides L4 may be opposite each other.

The first region a1 may be a region having the first long side L3 located far from the hinge device 130 at a periphery of the touchscreen display, and the second region a2 may be in a region having the second long side L1 located far from the hinge device 130 at a periphery of the data input unit 113. In addition, third regions a31 and a32 may be respectively located at positions having the two short sides L4 of the second housing 120, and fourth regions a41 and a42 may be respectively located at positions having the two short sides L2 of the first housing 110. Thus, the third region may be divided into the third region a31 on a left side (e.g., one direction) and the third region a32 on a right side (e.g., another direction), and the fourth region may be divided into the fourth region a41 on the left side (e.g., one side) and the fourth region a42 on the right size (e.g., another direction).

The front-rear camera 125 may be located at a center portion of the first region a1, and the optical member 115 may be located at a center portion of the second region a2. However, the first region a1, where the front-rear camera 125 is located, may be one end or the other end of a region having the first long side L3 or may be a region between the one end and the other end. The second region a2 where the optical member 115 is located may be one end or the other end of a region having the second long side L1 or may be a region between the one end and the other end.

The front-rear camera 125 may be located in the left side of the third region a31 or the right side of the third region a32, and the optical member 115 corresponding to the front-rear camera 125 may be located in the left side of the fourth region a41 or the right side of the fourth region a42. For example, the front-rear camera 125 may be located at a center, upper end, lower end, or between the upper and lower ends of the left side of the third area a31, or may be located at a center, upper end, lower end, or between the upper and lower ends of the right side of the third region a32. In addition, the optical member 115 may be located at a center, upper end, lower end, or between the upper and lower ends of the left side of the fourth region a41, or may be located at a center, upper end, lower end, or between the upper and lower ends of the right side of the fourth region a42.

When the portable device 100 is in a folding state (e.g., a folding-in state or a folding-out state), the first region a1 and the second region a2, and the third regions a31 and a32 and the fourth regions a41 and a42 may be disposed to overlap with each other, and may face each other.

The portable device 100 may include an illumination sensor, a proximity sensor, a flash, or a speaker. A power/reset button, a volume button, or one or more microphones, may be disposed on a lateral side of the portable device 100. A connector and an earphone connection jack may be disposed on the other side of the portable device 100.

Figure 2A:
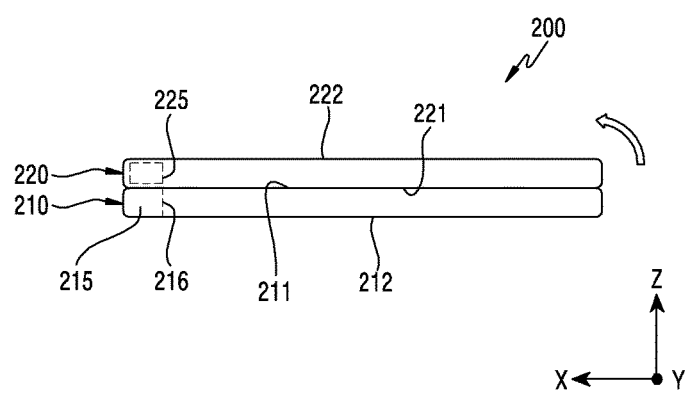
FIG. 2A is a lateral view illustrating a portable device in a folding-in state, according to an embodiment.
Figure 2B:
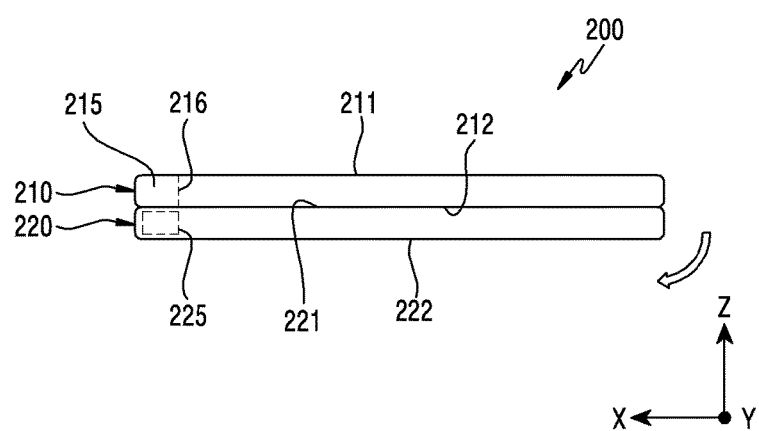
FIG. 2B is a lateral view illustrating a portable device in a folding-out state, according to an embodiment.

FIG. 2A is a lateral view illustrating a portable device in a folding-in state (rotation angle of 0 degree), according to an embodiment. FIG. 2B is a lateral view illustrating a portable device in a folding-out state (rotation angle of 360 degrees, such as a tablet PC mode), according to an embodiment.

Referring to FIG. 2A and FIG. 2B, in a portable device 200, a second housing 220 may rotate about a hinge device in a first housing 210 in the range of 0 to 360 degrees. As shown in FIG. 2A, the second housing 220 may be located in a first folding state in the first housing 210. The first folding state may be referred to as a folding-in state, or a closed state, in which a rotation angle is 0 degree.

In the first folding state of the electronic device 200, a front camera of a front-rear camera 225 may face an optical member 215.

As shown in FIG. 2B, in the portable device 200, the second housing 220 may be located in a second folding state in the first housing 210. The second folding state may be referred to as a folding-out state or a state in which a rotation angle is 360 degrees (tablet PC mode).

In the second folding state of the electronic device 200, a rear camera of the front-rear camera 225 may face the optical member 215.

In the first folding state of the portable device 200, a first plate 211 of the first housing 210 may be folded in a state of facing the third plate 221 of the second housing 220 in a surface-to-surface manner, and a second plate 212 of the first housing 210 may be opposite a fourth plate 222 of the second housing 220. In the second folding state of the portable device 200, the second plate 212 of the first housing 210 may be folded in a state of facing the fourth plate 222 of the second housing 220 in a surface-to-surface manner, and the first plate 211 of the first housing 210 may be opposite the third plate 221 of the second housing 220.

Figure 3:
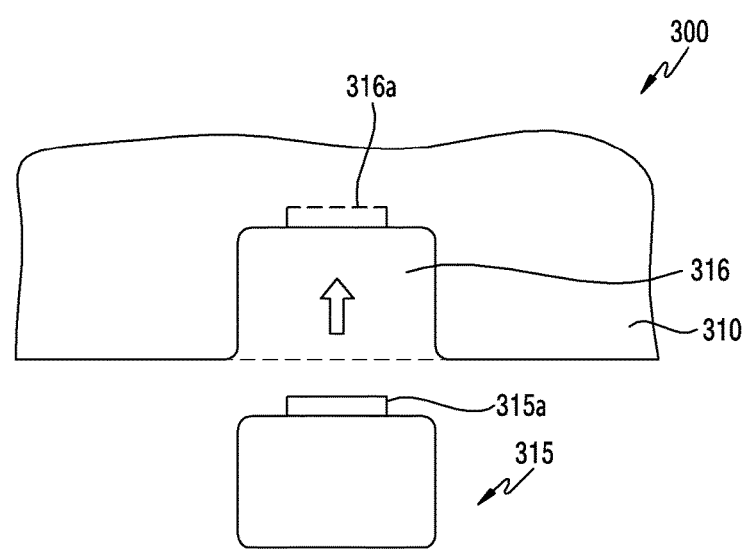
FIG. 3 is a plan view illustrating a state before an optical member is mounted to an opening of a first housing of a portable device, according to an embodiment.

FIG. 3 is a plan view illustrating a state before an optical member 315 is mounted to an opening 316 of a first housing 310 of a portable device 300, according to an embodiment.

Referring to FIG. 3, in the portable device 300, any one of the optical member 315 (e.g., a detachable lens module) and an additional functional device having an optical function may be mounted to the opening 316 of the first housing 310. The detachable lens module may include at least one lens. The additional functional device may be configured such that at least one lens is provided in a portion thereof, and a special additional function, such as a flash, is provided in the remaining parts.

A device mounted to the opening 316 may be provided with the optical member 315 capable of performing an optical operation of a front-rear camera, such as an operation of a camera for capturing a subject. The optical member 315 may be a lens or a filter for a special function of the front-rear camera. The front-rear camera may be capable of capturing a subject in a forward direction (third direction) or a backward direction (fourth direction) via the optical member 315.

The optical member 315 may be provided with a first connector 315a, and the first housing 310 around the opening 316 may be provided with a second connector 316a. The optical member 315 may be fixed to the opening 316 through bonding between the first connector 315a and the second connector 316a. The bonding between the first connector 315a and the second connector 316a may mean that the optical member 315 is electrically coupled to the opening 316 of the first housing 310, and is physically fixed.

Figure 4:
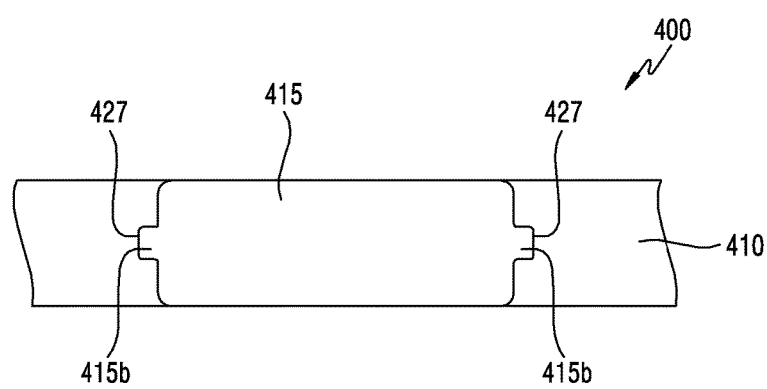
FIG. 4 is a plan view illustrating a guide structure of an optical member mounted to an opening of a first housing, according to an embodiment.

FIG. 4 is a plan view illustrating a guide structure of an optical member mounted to an opening of a first housing, according to an embodiment.

Referring to FIG. 4, in a portable device 400, an optical member 415 may be detachable in the opening in a sliding manner due to a sliding guide structure. The sliding guide structure may include guide projections 415b disposed on both sides of the optical member 415 and a sliding guide slot 427 disposed on each inner wall of the opening. As the guide protrusion 415b slides back and forth in the guide slot 427, the optical member 415 may be detached from the opening.

Figure 5A:
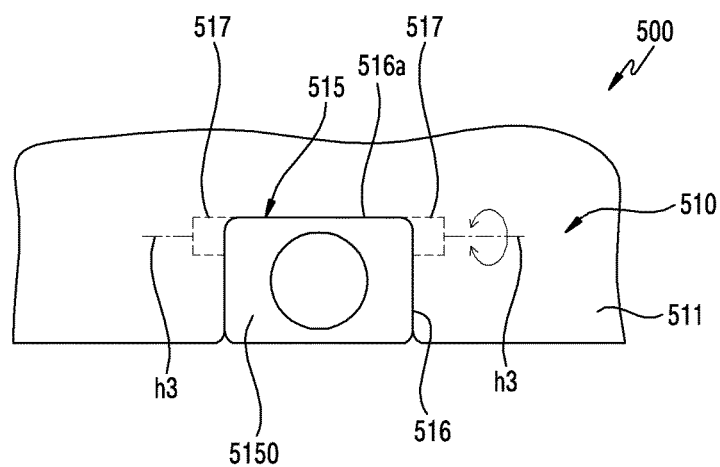
FIG. 5A is a plan view illustrating an optical member mounted to an opening of a first housing, according to an embodiment.

FIG. 5A is a plan view illustrating an optical member mounted on an opening of a first housing, according to an embodiment.

Figure 5B:
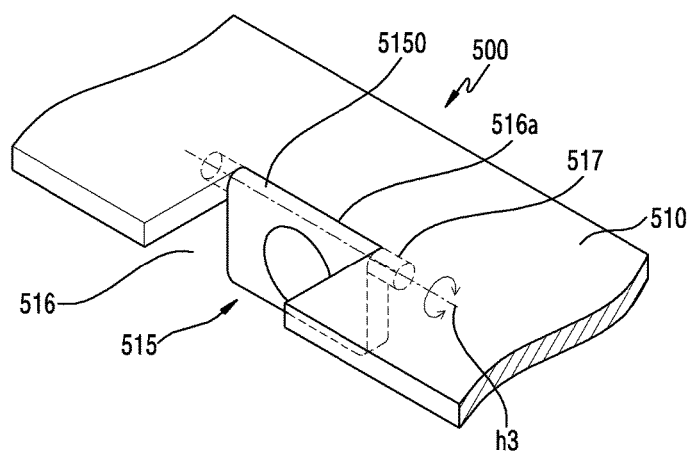
FIG. 5B is a plan view illustrating a state in which an optical member mounted to an opening of a first housing rotates by 90 degrees, according to an embodiment.

FIG. 5B is a plan view illustrating a state in which an optical member mounted to an opening of a first housing 510 rotates by 90 degrees, according to an embodiment.

Referring to FIG. 5A and FIG. 5B, a portable device 500 may have an optical member 515 rotatably mounted to an opening 516 of the first housing 510. For example, the optical member 515 may be mounted rotatably about a third hinge axis h3.

The optical member 515 may include a housing 5150 and a hinge housing 517 disposed at each side of the housing 5150. Each of the hinge housings 517 may be coupled to the first housing 510 about the third hinge axis h3. The third hinge axis h3 may face a direction parallel to the first hinge axis h1 and the second hinge axis h2. For example, for a portable device in a tablet PC mode, when the optical member 515 rotates about the third hinge axis h3 by approximately 90 degrees, the opening 561 is uncovered so that the front-rear camera can capture a subject located in a backward direction through the opening 516. The hinge housing 517 may be located in proximity to a closed portion 561a of the opening 561 at both lateral sides of the housing 5150. The housing 5150 may rotate about the third hinge axis h3 approximately by 180 degrees.

Figure 6:
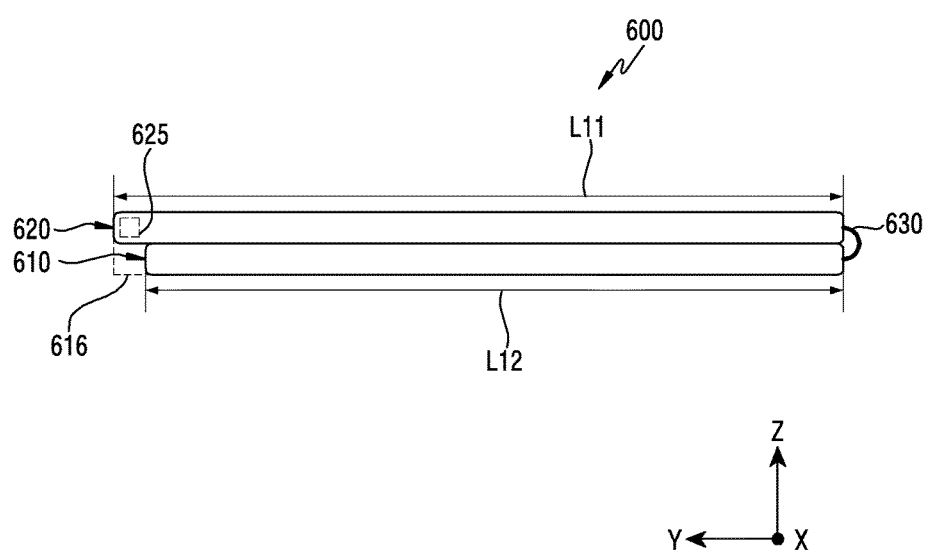
FIG. 6 is a lateral view illustrating a portable device in a closed state, according to an embodiment.

FIG. 6 is a lateral view illustrating a portable device in a closed state, according to an embodiment.

Referring to FIG. 6, a portable device 600 may include a first housing 610, a second housing 620, a front-rear camera 625 mounted to the second housing 620, and an opening 616 adjacent to the first housing 610. The first housing 610 and the second housing 620 may be rotatably coupled to each other via a hinge device 630, and may be electrically coupled to deliver a signal.

When the portable device 600 is configured such that a length L12 of a short side of the first housing 610 is less than a length L11 of a short side of the second housing 620, the opening 616 may be located in a region having a long side located far from the hinge device 630 of the first housing 610. The front-rear camera 625 may capture a subject located in a backward direction in a tablet PC mode via the opening 616.

Figure 7A:
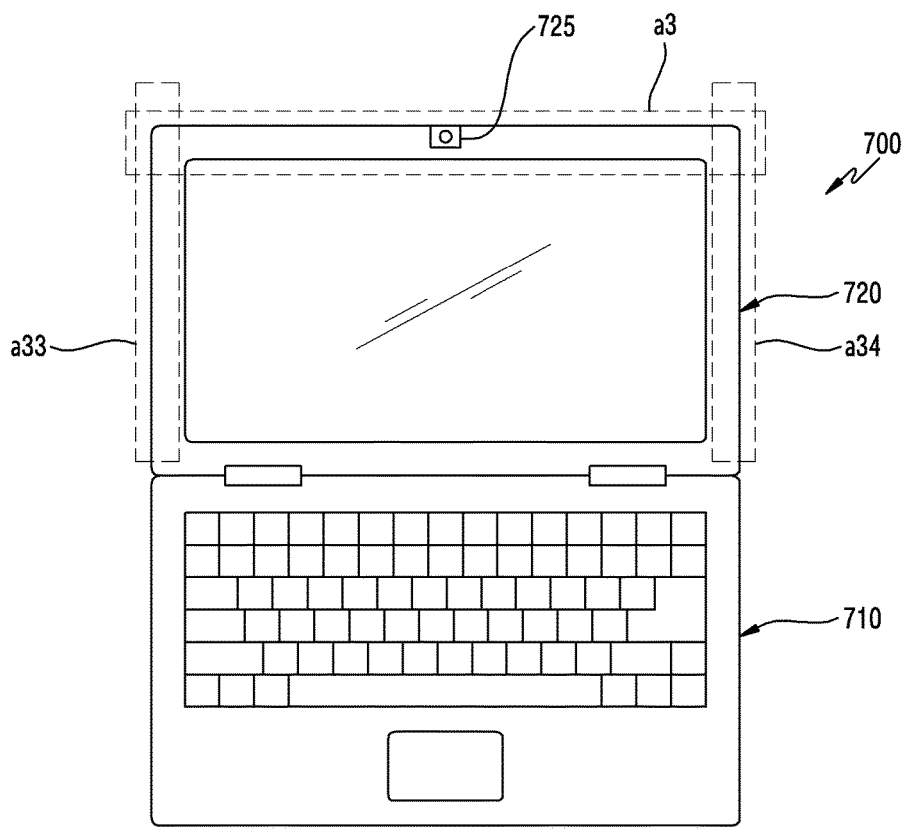
FIG. 7A is a plan view illustrating a portable device in a 180 degree open state, according to an embodiment.
Figure 7B:
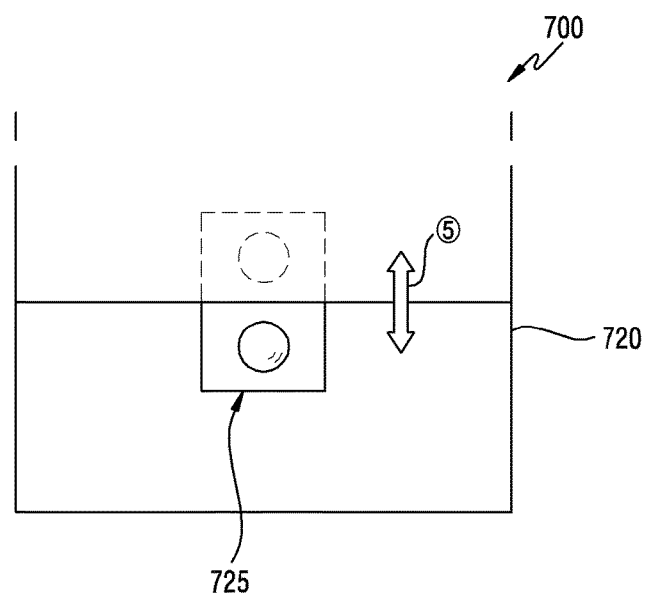
FIG. 7B is a plan view illustrating an inserted-ejected state of a front-rear camera of a portable device, according to an embodiment.

FIG. 7A is a plan view illustrating a portable device 700 in a 180 degree open state, according to an embodiment. FIG. 7B is a plan view illustrating an inserted-ejected state of a front-rear camera 725 of the portable device 700, according to an embodiment.

Referring to FIG. 7A and FIG. 7B, the portable device 700 may include a first housing 710, a second housing 720, and the front-rear camera 725 disposed on a specific region of the second housing 720 in an inserted-ejected manner. The front-rear camera 725 may move in a direction of an arrow ⑤.

The front-rear camera 725 is not necessarily limited to being disposed at a center portion of a first region a3, and may be disposed in an inserted-ejected manner at one end of the first region a3 or the other end thereof, or a region between the one end and the other end. In addition, the inserted-ejected front-rear camera 725 may be disposed on a left side of a third region a33 (one direction) of the second housing 720 or on a right side of a third region a34 (another direction) as shown in FIG. 1B. For example, the front-rear camera 725 may be located at a center, upper end, lower end, or between the upper and lower ends of the third region a33 on the left side, or may be located at a center, upper end, lower end, or between the upper and lower ends of the third region a34 on the right side.

When the front-rear camera 725 is in an ejected state (a state indicated by a dotted line in FIG. 7B) in the second housing 720, the front-rear camera 175 may capture a subject in a forward direction or a backward direction in a folding-in or folding-out state of the portable device 700. In particular, in a tablet PC mode (such as that of FIG. 2B) of the portable device, the front-rear camera 725 may capture the subject located in the backward direction.

FIG. 8A, FIG. 8B, FIG. 8C, and FIG. 8D are perspective views respectively illustrating different modes of portable devices, according to various embodiments.

Figure 8A:
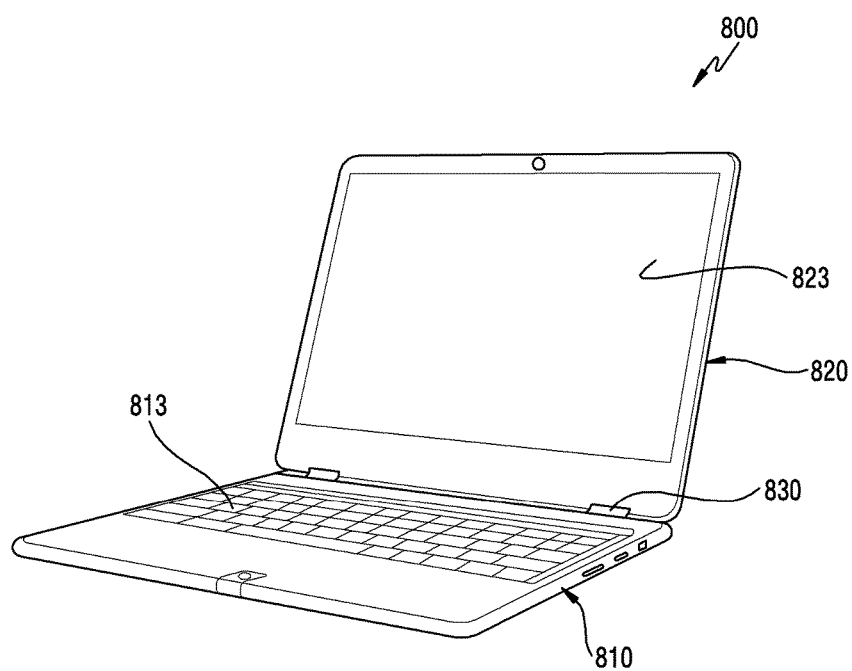
FIG. 8A, FIG. 8B, FIG. 8C, and FIG. 8D are perspective views respectively illustrating different modes of portable devices, according to various embodiments.

Referring to FIG. 8A, a portable device 800 may be in a state in which a display 823 is mounted on the first housing in an inclined manner by rotating a second housing 820 by approximately 100 to 120 degrees about a first housing 810. Force for maintaining the inclined mounting state may be provided by a hinge device 830, such as a damping hinge. The portable device 800 is in a mode in which keyboard 813 typing is enabled to input desired data.

Figure 8B:
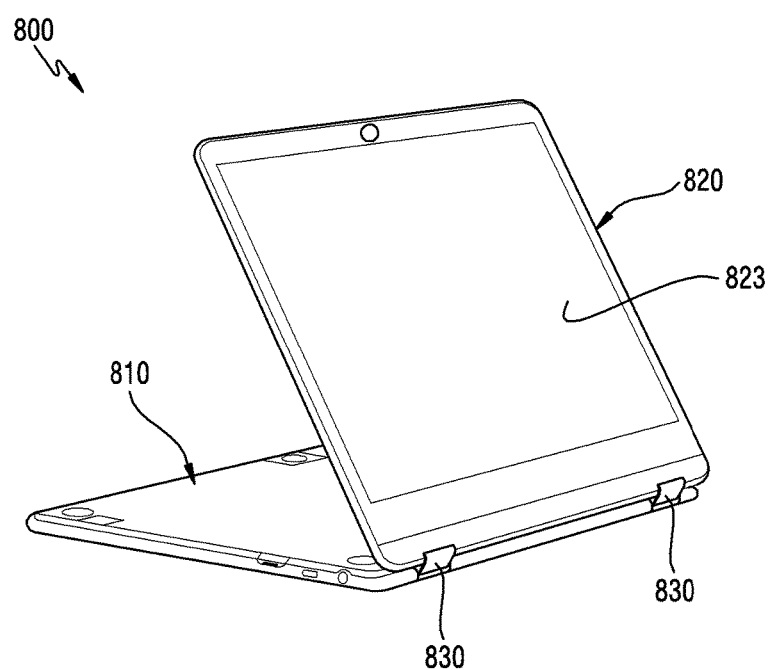

Referring to FIG. 8B, the portable device 800 may be in a state in which the display 823 is mounted in an inclined manner by rotating the second housing 820 by approximately 300 to 320 degrees about the first housing 810. Force for maintaining the inclined mounting state may be provided by the hinge device 830, such as a damping hinge. The portable device 800 is in a mode in which a touch input of the touchscreen display 823 is enabled to input desired data by using a finger or a stylus pen.

Figure 8C:
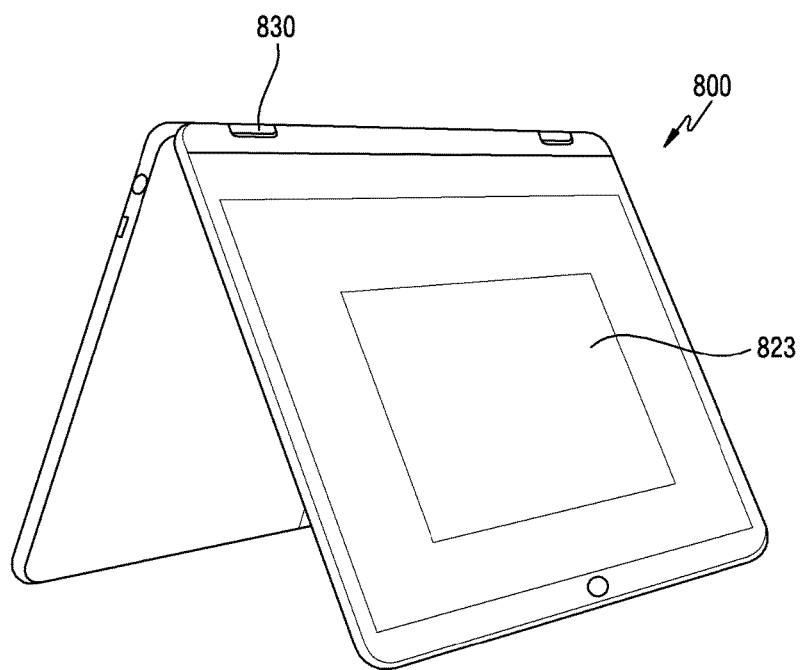

Referring to FIG. 8C, the portable device 800 may be in a state in which the touchscreen display 823 of FIG. 8B is turned upside down, as an example of indicating another usage of the portable device of FIG. 8B. Force for maintaining the inclined mounting state may be provided by the hinge device 830, such as a damping hinge. The portable device 800 is in a mode in which a touch input of the touchscreen display 823 is enabled to input desired data by using a finger or a stylus pen.

Figure 8D:
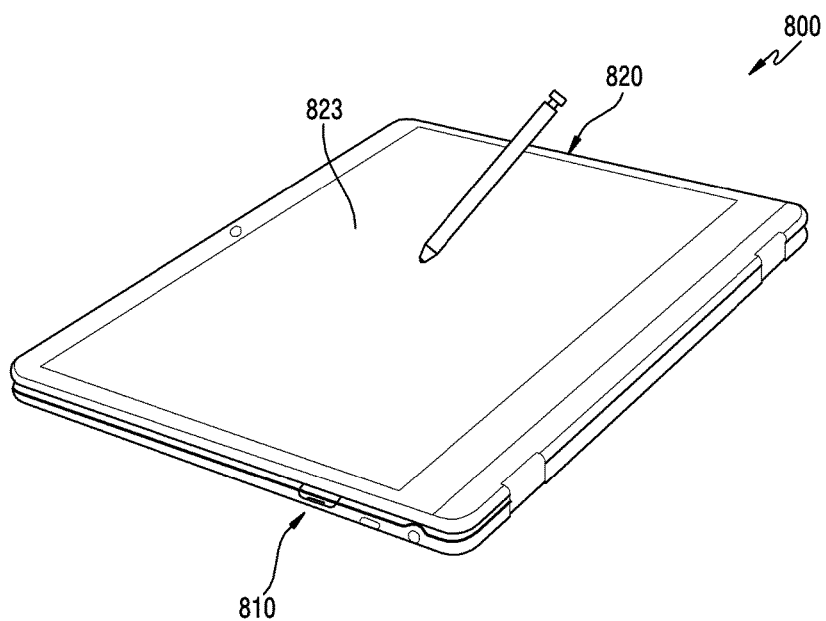

Referring to FIG. 8D, the portable device 800 may be in a state in which a touchscreen display is horizontal by rotating the second housing 820 by approximately 360 degrees about the first housing 810. The portable device 800 is in a tablet PC mode in which a touch input of the touchscreen display 823 is enabled to input desired data by using a finger or a stylus pen.

The computer readable recording medium may include magnetic media such as a hard disk, a floppy disk and a magnetic tape. Additionally, the computer readable recording medium may include optical media such as a compact disc read only memory (CD-ROM) and a digital versatile disc (DVD), or magneto-optical media such as a floptical disk. Further, the computer readable recording medium may include a hardware device specially configured to store and execute a program command, such as a read only memory (ROM), a random access memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements may be executed sequentially, in parallel, repeatedly, or in a heuristic manner. Furthermore, some operations may be executed in a different order or may be omitted, or other operations may be added.

The embodiments disclosed in this specification and drawings are merely presented to easily describe the technical contents of the present disclosure and to help with understanding of the present disclosure, and are not intended to limit the scope of the present disclosure. Therefore, all changes or modifications derived from the technical idea of the present disclosure as well as the embodiments described herein should be interpreted to belong to the scope of the present disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A portable device comprising:
   a first housing;
   a second housing rotatably coupled to a hinge device in the first housing; and
   a front-rear camera mounted to a first region of the second housing,
   wherein an opening is located in a second region of the first housing overlapping with the first region when the second housing is in a state of being folded to the first housing.

2. The portable device of claim 1, wherein the first housing comprises:
   a first plate facing a first direction; and
   a second plate facing a second direction opposite to the first direction,
   wherein the second housing comprises:
   a third plate facing a third direction; and
   a fourth plate facing a fourth direction opposite to the third direction,
   wherein the folding state is a folding-in state in which the first plate of the first housing and the third plate of the second housing are folded facing each other, or
   the folding state is a folding-out state in which the second plate of the first housing and the fourth plate of the second housing are folded facing each other.

3. The portable device of claim 2, wherein the front-rear camera is capable of capturing a subject in the third direction or the fourth direction of the second housing via the opening.

4. The portable device of claim 1, wherein the folding state is a state where a rotation angle of the second housing is 0 or 360 degrees in the first housing.

5. The portable device of claim 2, wherein a data input unit is disposed on the first plate of the first housing, and a data output unit is disposed on the third plate of the second housing.

6. The portable device of claim 5, wherein the first region is disposed on at least part of a periphery of the data output unit, and the second region is disposed on at least part of a periphery of the data input unit.

7. The portable device of claim 6,
   wherein the first region is located in a region having a first long side located far from the hinge device at the periphery of the data output unit, and
   wherein the second region is located in a region having a second long side located far from the hinge device at the periphery of the data input unit.

8. The portable device of claim 7, wherein the first region is located at a center portion of the region having the first long side, and the second region is located at a center portion of the region having the second long side.

9. The portable device of claim 1, wherein a detachable optical member is disposed on the opening.

10. The portable device of claim 9, wherein the front-rear camera is capable of capturing a subject in the third direction or the fourth direction via the optical member.

11. The portable device of claim 9, wherein the optical member is constructed of a transparent material, or at least one lens is mounted on the optical member.

12. The portable device of claim 9, wherein the optical member is detachable in a sliding manner.

13. The portable device of claim 12, wherein a first connector is provided with the optical member, a second connector is provided in a second housing around the opening, and the optical member is fixed to the opening through bonding between the first connector and the second connector.

14. The portable device of claim 9, wherein the optical member is disposed to the opening rotatably about a second hinge axis parallel to a first hinge axis.

15. The portable device of claim 9, wherein the optical member further comprises an additional device.

16. A portable device comprising:
a main body;
a touchscreen display disposed on the main body in a folding-in or folding-out state by being rotatably coupled to a hinge device in the main body;
a front-rear camera mounted adjacent to the touchscreen display; and
an opening disposed on a portion of the main body overlapping with the front-rear camera when the touchscreen display is folded on the main body.

17. The portable device of claim 16, wherein a detachable lens module is accommodated in the opening.

18. The portable device of claim 17, wherein the front-rear camera captures a subject located in a backward direction by using the detachable lens module when the portable device is in a tablet personal computer (PC) mode.

19. The portable device of claim 16, wherein a folding state of the portable device comprises the folding-in or the folding-out state.

20. The portable device of claim 17, wherein a first connector is provided with the detachable lens module, a second connector is provided in the touchscreen display around the opening, and the detachable lens module is fixed to the opening through sliding bonding between the first connector and the second connector.

* * * * *